June 5, 1945.　　　　G. S. BINCKLEY　　　　2,377,605
FLUID METER
Filed April 1, 1941　　　　2 Sheets-Sheet 1
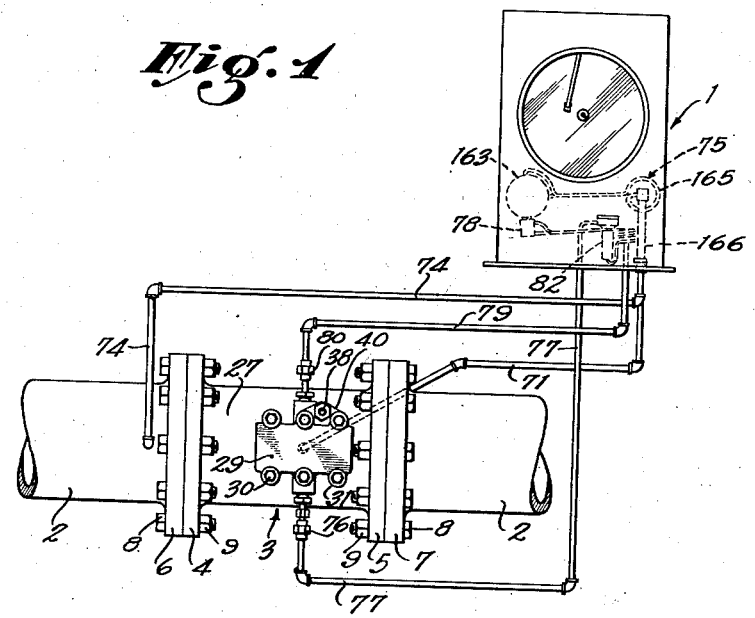

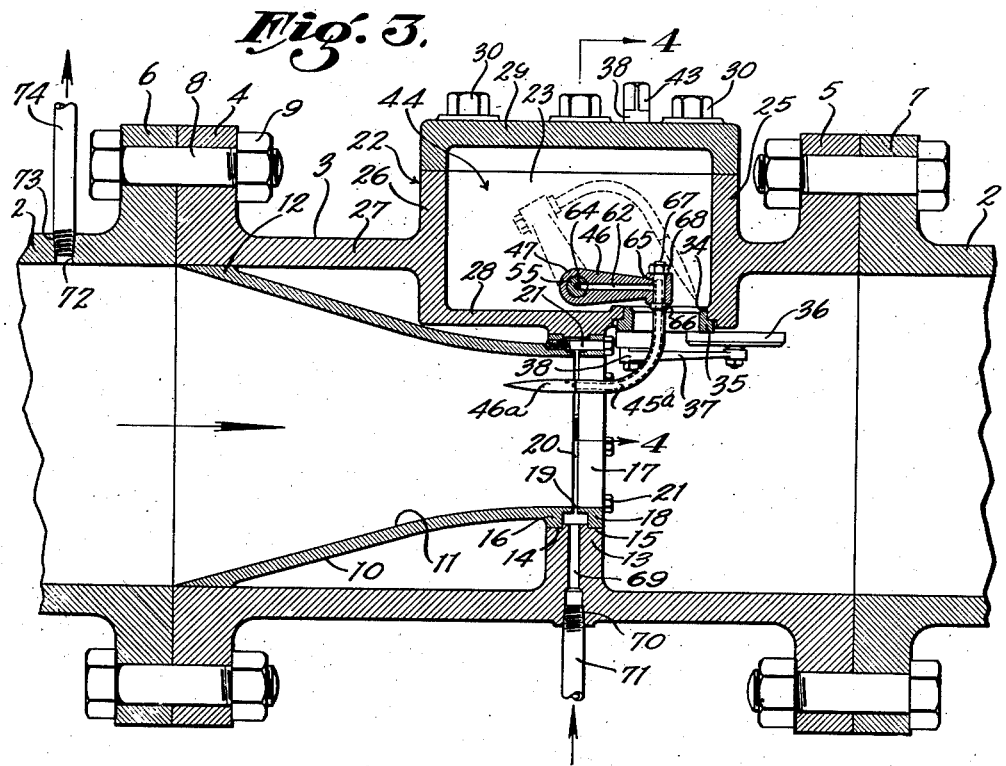
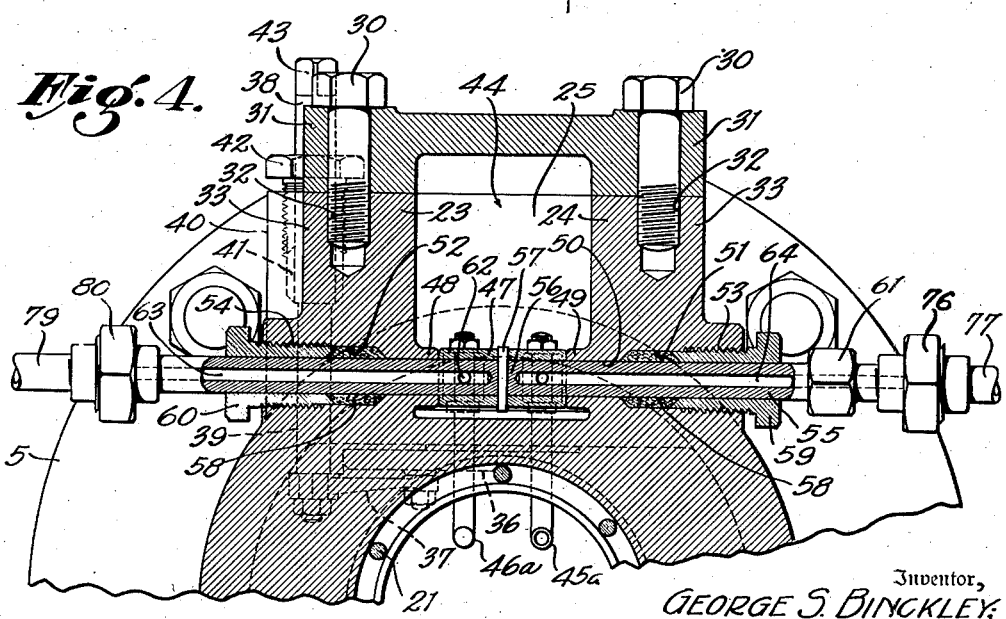

Patented June 5, 1945

2,377,605

UNITED STATES PATENT OFFICE 2,377,605

FLUID METER

George S. Binckley, Los Angeles, Calif., assignor, by decree of court, and mesne assignments, to Sydney William Binckley, as trustee Application April 1, 1941, Serial No. 386,229

14 Claims. (Cl. 73—212)

This invention relates to improvements in fluid meters generally, and more specifically to an instrumentality adapted to be placed in a fluid conduit, and so functioning that when fluid is moving through the conduit, there will be a difference in pressure effect developed by said instrumentality representative of the actual velocity of the flowing stream.

As the instrumentality above noted, I have utilized Pitot tubes placed within a contracted throat, and at the minimum cross section of the throat. The Pitot tubes are so positioned within the throat that there is no effect of viscosity upon the differential pressure produced by the velocity of the fluid and the formation of a vena contracta is overcome.

An object of the present invention is to so mount the Pitot tubes that they may be interposed in the path of fluid passing through a contracted throat or readily removed therefrom, which permits cleaning of the tubes, or repair thereof. The construction is also such that during the time the Pitot tubes are being inserted into and removed from the contracted throat, no stoppage in the flow of fluid is necessary or required.

With the above mentioned and other objects in view, the invention consists in the novel and useful provision, formation, construction, association, and relative arrangement of parts, members, and features, all as shown in certain embodiments in the accompanying drawings, described generally, and more particularly pointed out in the claims.

In the drawings:

Figure 1 is an elevational view of one form of fluid meter shown in cooperation with a pipe line through which a fluid or gas is passed, the weight rate of flow of which is to be indicated by the meter, Figure 2 is an enlarged detail of means interposed in the fluid pipe line, and forming a part of the meter, Figure 3 is a sectional view on the line 3—3 of Figure 2, Figure 4 is an enlarged detail on the line 4—4 of Figure 3, Figure 5 is a sectional view of a detail shown in broken lines in Figure 1.

2 is a pipe line which is cut to receive means 3, the means 3 being detailed in Figures 2, 3 and 4. The means 3 constitutes an orifice or contracted throat, through which the fluid to be measured must pass, together with devices placed within the orifice or contracted throat and so functioning that when fluid is moving through said orifice or throat, there will be a difference in pressure effect in the said devices representative of the actual velocity of the flowing stream. The meter 1 is directly connected to the means 3 for indicating such differential pressure. Specifically, means 3 includes a casting provided with flanged ends 4 and 5 adapted to mate with like flanged ends 6 and 7 on pipe 2. These flanges may be provided with aligned transverse bores, through which are passed bolts 8 carrying nuts 9 for securing the flanges together. Within the casting is a contracted throat member 10. Surface 11 of member 10 is in the form of an elliptical curve and the approach cone is tangent to the curve. At the zone of greatest diameter is an annular external flange or foot 12, adapted to fit tightly within the confines of the casing. The opposite end portion, being the portion of minimum diameter, may be supported by an annular rib 13 formed in the casting. This annular rib is provided with a pair of annular shoulders 14 and 15, the contracted throat being provided with an external annular flange 16 adapted to rest on the annular shoulder 14. A ring 17 is provided with an annular flange 18, which flange rests upon the shoulder 15. This ring is adapted to be slightly spaced from the end 19 of said throat member 10, the spacing being indicated by 20. The ring and the contracted throat member are held in working relationship by means of screw bolts 21, cooperatively engaging the annular flanges 16 and 18. This space, indicated at 20, is an annular slit, and for the purpose of the present description, the said ring may be considered as a part of the contracted throat member, although for convenience of construction, the device may be formed as shown in Figure 3.

The casting 3 has integrally formed therewith a box member 22, the sides 23, 24 and ends 25, 26 of which are formed by flanging the casting both inwardly and outwardly relative to the generally curved portion 27 thereof, and a base 28 integrally formed with the sides and ends. This base carries a portion of the annular rib 13. A cap 29 is adapted to fit over the top of the box and be held thereover by means of threaded bolts 30 passed through elongated ears 31 spacedly formed on said cap and into threaded openings 32 in enlargements 33 formed on the side walls of the box. The base 28 is provided with an opening 34 within which is fitted a shouldered valve seat 35. A valve 36 is carried on one end of an arm 37, the opposite end of the arm being secured to a spindle 38 passed through a casting, as see the dotted lines 39 (Figure 4), through an enlargement 40 formed to receive a gland 41 held in place by a gland nut 42, the gland nut surrounding the spindle. The upper end of the spindle is squared at 43. The arrangement is such that through a suitable wrench on the squared end 43, the spindle may be rotated to position the valve 36 over the seat 35 or to be moved transversely away from the seat, as shown in the dotted line position of Figure 2, and the full line position of Figure 3.

Within the chamber 44 of the box are a pair of arms 45 and 46, carried by sleeve 47. This sleeve is adapted to be interposed between two annular studs 48 and 49, projecting inwardly of the chamber 44 and formed on the side walls 23 and 24. A transverse bore 50 extends through the side walls of the box at the zone of said studs 48 and 49. This bore is counter-bored at 51 and 52, and screw-threadedly counter-bored at 53 and 54. A tube 55, provided with a division wall 56, in order that the bore should not be continuous, is passed through the bore 50 and the counter-bores, and is centrally pinned at the wall 56 by means 57 to sleeve 47. Packing glands 58 are fitted in the counter-bores 51 and 52 and gland nuts 59 and 60 cooperate with the threaded counter-bores 53 and 54, respectively, for compressing the glands about the periphery of the tube. The tube 55 carries externally of the gland nut 59 a flat-faced enlargement 61, whereby, through a suitable wrench, the tube may be rotated to rotate the sleeve 47.

The outermost ends of the arms 45 and 46 carry Pitot tubes. The arm 45 carries a positive Pitot tube 45a and the arm 46 a static tube 46a. These tubes are of well known construction and will not be detailed other than to say that the static tube is pointed, as shown in Figure 3, and transversely provided with openings communicating with the interior of the tube, while the positive tube is open-ended. Both arms 45 and 46 are provided with passageways 62 communicating with the interior of each Pitot tube and said openings 62 in turn communicate with the interior of the tube 55. As the tube 55 is divided as to passageway, the static Pitot tube communicates with the bore at 63, and the bore of the positive Pitot tube with the bore at 64. Each arm 45 and 46 is enlarged at its free end and transversely bored as shown at 65. Each Pitot tube is provided with an annular flange 66 and with a closed screw-threaded end 67. Each tube is passed through a bore 65 to position the flange 66 against the enlargement of its respective arm, with a nut or the like 68 on the screw-threaded end 67 to secure the tube on said arm, and in such a position that the bore of said tube directly communicates with the bore in the arm. It is to be observed that the Pitot tubes may be swung into the chamber 44 or out of the chamber into the flow path of any fluid passing through the contracted throat 10, when the valve 36 is in open position.

The positive and static Pitot tubes point upstream, and the tubes are placed in substantially the same cross sectional plane with their openings in the contracted throat member 10 at the zone of minimum diameter thereof, with the point of measurement at a distance from center of the axis of said contracted throat of approximately .7 of the radius of the throat. This point in the minimum cross section of the throat is the point of theoretical average velocity of flow of a fluid when the velocity profile is parabolic. The arrangement described is obviously such that there can be no effect of viscosity upon the differential pressure produced by the velocity of the fluid at this point, as whatever its viscosity, only its actual velocity can produce the corresponding differential pressure. Hence, by this means, the differential pressure is that which is produced by the actual velocity of the fluid in passing through the contracted throat at the point at which measurement is made.

As stated, the preferred form for the contracted throat or orifice is one in which the longitudinal section of part of the throat conforms to an elliptical curve, the point of measurement being a minimum cross section on the minor axis of the ellipse, the approach cone being formed with its surface tangent to some point on the elliptical curve. By the use of this mode of design, there will be little or no chance for the formation of a vena contracta at the point of measurement or on the minor axis of the ellipse, even at velocities higher than those customarily found in practice.

The web 13 is formed with a bore 69 which is provided with a threaded counter-bore 70, whereby the threaded end of a pipe or tube 71 may be secured at this zone. The bore 69 is in direct communication with the annular slit or space 20. When a fluid is passing through the contracted throat, the zone of negative or static pressure is in the plane of the slit 20. On the upstream or positive side of the pipe 2 is a transverse bore 72, which is provided with a threaded counter-bore 73, whereby the threaded end of a pipe 74 may be secured at this zone. If we refer to Figure 1, we will observe that pipes 71 and 74 communicate with means 75. This means permits a measurement of the density of the liquid flowing through the pipe 2. It is, of course, obvious that any fluid flowing in pipe 74 is under higher pressure than fluid in pipe 71, with the result that fluid will flow through pipe 74 into the means 75 and back through pipe 71. This means 75 is utilized when the fluid is a liquid, and need not be utilized when the fluid to be measured is a gas.

The bore 64 of tube 55 communicates through the medium of a coupling 76 with pipe 77, which leads to differential pressure means, designated generally as 78. The bore 63 connects with pipe 79 through coupling 80 to the means 78. The means 75 and 78 cooperate through an integrating linkage to actuate a pen arm over a chart and to give a single line reading on said chart, which is representative of the weight of a liquid or fluid moving through contracted throat 10.

The integrating linkage forms a part of the meter 1, and said meter includes in addition to the linkage, a reservoir 82 adapted to hold a liquid, such as mercury.

The reservoir 82 includes an elongated body 89 and an enlarged head 90. The elongated body is provided with a tapered bore 91, the diameter of the bore gradually increasing toward the head 90, with the wall bounding the bore substantially curved or bell-mouthed at 92. The head 90 is provided with a curved wall chamber 93 joining the wall 92 at a zone 301, adapted to be enclosed by a cap 94 held to the side wall of the head in any suitable manner, such as by screw bolts 95. The head and the elongated body are provided with lateral enlarged extensions 96 and 97 passed through openings 98 and 99 in the base or back wall 100 of the meter case. The extension 96 is formed with a bore 101 communicating with the curved wall chamber 93. The bore 101 is screw-threadedly counter-bored at 102 to receive a threaded nipple 103, the nipple being secured to the end of a pipe 77.

A tube 104 communicating with bore 91, is secured to the end of the elongated body 89. This tube is coiled at 105, with a length thereof connected to the base of an operating chamber, not shown. A tube is secured to and communicates with the interior of said operating chamber adjacent the top thereof. Said tube is coiled at 111 in a manner similar to the coil 105, the tube finally terminating after leaving said coil, in a fitting threaded to the extension 97, the fitting communicating with a bore 112 in said extension. The bore 112 is threadedly counterbored at 113 to receive a threaded fitting 114, the pipe or tube 79 being secured to said fitting at one end.

Means 75, shown in Figure 1, includes a bulb or chamber 163, with a first tube communicating at one end with the interior thereof, which tube is partly coiled at 165, and then secured to and in communication with a pipe 166. This pipe directly connects with pipe 74. A second tube is received within the bulb or chamber 163, and has a length paralleling the first tube, provided with a coiled end portion (not shown), and which connects with an upstanding pipe (not shown) but similar to the pipe 166. This second tube communicates with pipe 71.

The operation, uses and advantages of the invention are as follows:

Taking first that form of the invention wherein the density bulb or chamber 163 is used, liquid flows continuously through tube 74 into the bulb or chamber 163 and back through pipe 71 into the annular space 20 by differential pressure produced by flow through the contracted throat.

The positive Pitot tube 45ª is connected with the reservoir 82 above the surface of the liquid therein and the static Pitot tube 46ª through tube 79 with the other reservoir (not shown). Hence, when a liquid is passed through the contracted throat, there is a differential pressure produced by the actual velocity of the liquid in passing through the contracted throat at the point at which measurement is made. As has been before stated, viscosity of the liquid has no effect upon the differential pressure produced by the velocity of the liquid at that zone of the contracted throat at which measurement is made. Hence, in my invention, the effect of viscosity is eliminated, and consequently, there is minimized any error which might exist if the positive or upstream connection were made with pipe 74 and the negative connection were made to an annulus surrounding the throat at the point of measurement.

I have heretofore set forth the specific position of the Pitot tubes relative to the contracted throat 10 and through the arrangement shown and described, I obtain a differential pressure which is produced by the actual velocity existing in the fluid through the throat and which is a true and correct measure of the velocity. It is evident that the Pitot tubes may be rotated to the dotted line position shown in Figure 3, whereupon the cap may be removed, to the end that the Pitot tubes may be inspected, removed from their carrying arms and replaced by new tubes without the necessity of breaking down the entire mechanism. The valve arrangement is such as to close entrance within the chamber 44 without disrupting the flow of any liquid through the throat. This is a feature of importance when the pipes 2 carry fluid which is constantly passing therethrough, and if any difficulty arise with the meter mechanism, a shut down of the line might entail considerable work and expense, all of which is overcome by the arrangement shown. It is a simple matter, through the medium of a wrench, to revolve the arms carrying the Pitot tubes into the chamber 44, close the valve 36 to its seat, and remove the cap.

In order that the improvements made through this invention may be fully understood, it is necessary to describe briefly the principal methods heretofore employed for the measurement of a fluid passing through a pipe line.

The commonest of these methods and the one having the widest acceptance in practice is that which is generally described as the orifice meter, in which a plate having a circular orifice in its center is inserted in a pipe line, forming thus a contraction in the line and producing at the orifice an increase in velocity of the fluid. In order that this device may be employed as a mode of measurement, it is necessary to indicate or to record the difference in the pressure in the pipe line upstream and downstream of this orifice. It is plain that the introduction of such an orifice in a pipe line constitutes an obstruction to flow and that there must constantly be produced a difference in pressure upstream and downstream from this orifice, and in practice, this difference of pressure is indicated or recorded by a suitable instrument and on the basis of this observed or recorded difference of pressure, the velocity of flow through the orifice is computed and the quantity finally determined on the basis of this velocity and the cross sectional area of the orifice.

This widely accepted and indeed conventional mode of fluid measurement, however, presents in its practical application a large number of variables originating in those changed conditions of flow, which result from differences in the velocity, in the relation of diameter of orifice to the diameter of the pipe line, and in the fact that the cross section of the fluid at a calculated velocity due to the differential pressure is that of a vena contracta downstream of the orifice and always of less cross section than the orifice itself. Added to this is found the necessity, especially in the case of a gas, for applying corrections to the recorded differential pressure covering the pressure of the fluid, the specific gravity of the fluid, its temperature, and in the case of a gas, the deviation from Boyle's law. All of these factors have to be recognized under the common method of orifice measurement of gases in order to secure even an approximately correct measurement of the amount of gas passing through the orifice under the observed or recorded differential pressure. Even where accurate data covering the elements necessary to make these corrections are available, there remains an element tending to vitiate these results that originates in the condition of turbulence of the flowing stream above and below the orifice, this condition of turbulence varying with the velocity of flow, the viscosity of the fluid, and the frictional resistance of the walls of the conduit. It is thus seen that under the commonly established and accepted practice of orifice measurement of either gases or liquids, the conditions under which such measurement must be made are so complex as to make the attainment of accuracy extremely difficult.

Where liquids alone are concerned in the measurement to be made, certain of the factors which must be recognized and corrected in the measurement of gas are absent, and others not important in gas measurement become a serious matter in the measurement of liquids. In this case, in order that an accurate measurement of a liquid passing through a pipe line shall be accomplished, three factors must be recognized and corrections applied in order to secure an accurate result. The first of these factors is the specific gravity or density of the liquid, as upon this factor will depend the value of the differential pressure observed or recorded. Second, is the viscosity of the liquid itself, which has an influence on the rate of flow and the extent to which frictional resistance enters into the final result. Third, a correction must be made for the effect of temperature on the actual density of the liquid, and its effect upon the fluidity of the liquid in increasing or decreasing its viscosity. Where these factors are known or accurately determinable, they can be applied through proper mathematical processes as corrections which when integrated with the differential pressure, may give results approximating the truth even where the flow is through a flat plate orifice interposed in a pipe line. However, it is obvious that if these corrections are to be complete, means must in every case be provided—for instance in the case of gas measurement—for accurately recording the temperature, pressure and specific gravity of the gas at the point of measurement, requiring, of course, three separate instruments for this purpose, in addition to the instrument which records the differential pressure.

In the case of a liquid measurement under the ordinary mode of applying the orifice measurement, accuracy in results demands that there shall be a complete record made of the specific gravity, temperature, and viscosity of the flowing liquid at the point of measurement, this again requiring for completely satisfactory data the use of a specific gravity recorder, a recording viscosimeter, and a recording thermometer, in addition again to the differential pressure recorder. Having complete data of this kind, and through the use of the proper formulae, a reasonably accurate liquid measurement is possible through the use of an orifice in a pipe line. It will be observed that in present conventional practice, that even where all of these data are made available, their employment as correction factors together with the record of the differential pressure is not automatic but requires the application of definite mathematical processes in order to arrive at the final result.

In order to illustrate clearly one point of importance in the measurement of liquids passing through an orifice interposed in a pipe line, it is to be remembered that a differential pressure recorder can in itself recognize only the difference in pressure existing between two points, and that this difference in pressure will be affected by a difference in the viscosity of the liquid and will show a higher or lower value as the viscosity is higher or lower, even at precisely the same rate of flow through the orifice. It is thus seen that without a knowledge of the changing viscosity of the liquid, and ignoring the effect of specific gravity and temperature, it is impossible, with the ordinary orifice meter set-up, to expect anything like an accurate result without full knowledge of the factors of viscosity, temperature and specific gravity. With gas, the factor of viscosity exists but is of very much less importance while on the other hand the density variations in the case of gas are very much greater than those common with liquids, due to the fact that the gas may be highly compressed and have, therefore, a relatively great density while the compressibility of the liquids is insignificant and its density is effected only by variations in temperature.

Finally, to sum it up, with my invention, it is seen that the meter comprising, as it does the dynamic element which is represented by the arrangement of Pitot tubes in a contracted throat in the pipe line and the recording and integrating element connected, as shown in the drawings, to the pipe line, produces by fully automatic action when the density bulb is employed a single line record on a chart which has a value which, under present practice in the orifice measurement of gas, can only be attained by:

1. A record of the differential pressure;
2. A record of the temperature of the gas;
3. A record of the pressure of the gas;
4. A record of the specific gravity of the gas;
5. A modification of the density as required by the deviation from Boyle's law; and
6. The calculations necessary to integrate all of these last four elements with the differential pressure, and the final application of an empirical coefficient which has been laboriously developed to cover varying conditions of flow within the pipe line.

I claim:

1. An instrument responding to flow in a fluid conduit comprising a Pitot tube having an operative position wherein its opening is within and intermediate the ends of said conduit, means beyond the path of fluid flow pivotally supporting said tube against axial rotation, and a housing for said means receiving said tube in an inoperative position.

2. An instrument responding to flow in a fluid conduit comprising a Pitot tube having an operative position wherein its opening is eccentrically disposed within said conduit, means having an axis in a plane parallel to said conduit and beyond the path of fluid flow pivotally supporting said tube, a housing for said means receiving said tube in an inoperative position, and means for projecting and retracting said tube through the wall of said conduit about its pivotal supporting means to and from said operative position.

3. An instrument responding to flow in a fluid conduit comprising a Pitot tube having an operative position wherein its opening is within said conduit, means beyond the path of fluid flow pivotally supporting said tube on an axis transverse with respect to said tube for arcuate movement between operative and inoperative positions, a housing for said means receiving said tube in an inoperative position, means defining a port through which said tube is movable between its operative and inoperative positions, and a closure for said port.

4. An instrument responding to flow in a fluid conduit comprising a Pitot tube having an operative position wherein its opening is within said conduit, means beyond the path of fluid flow pivotally supporting said tube about an axis parallel to a diameter of said tube, a housing for said means receiving said tube in an inoperative position, and means accessible exteriorly of said conduit for pivotally moving said tube through the wall of said conduit between its operative and inoperative positions.

5. An instrument responding to flow in a fluid conduit comprising a Pitot tube, means pivotally mounting said tube for arcuate movement from an operative position within said conduit to an inoperative position beyond the path of fluid flow, a housing to receive said tube in its inoperative position, means defining a port through which said tube is movable between its operative and inoperative positions, a closure for said port, and means accessible exteriorly of said conduit for operating said closure to cover and uncover said port.

6. An instrument responding to flow in a fluid conduit comprising a contracted throat provided in said conduit, a Pitot tube, means pivotally mounting said tube for arcuate movement to and from an operative position with its opening in said throat and radially spaced about .7 of the throat radius from the throat axis.

7. An instrument responding to differential pressures in a fluid conduit comprising a contracted throat provided in said conduit, and positive and static Pitot tubes supported with their openings in substantially the same cross sectional plane of said throat and radially spaced about .7 of the throat radius from the throat axis.

8. An instrument responding to differential pressures in a fluid conduit comprising a contracted throat provided in said conduit, positive and static Pitot tubes pivotally supported in an operative position with their openings in said throat, a housing beyond the fluid path of said conduit for receiving said tubes in an inoperative position, and pivot means in said housing about which said tubes may be shifted to and from said positions.

9. An instrument responding to differential pressures in a fluid conduit comprising positive and static Pitot tubes having their openings in operative positions eccentrically arranged substantially in a single cross sectional plane of said conduit, and pivot means radially spaced from said conduit and extending transversely thereof supporting said tubes with respect to said conduit.

10. An instrument responding to differential pressures in a fluid conduit comprising pivotally mounted positive and static Pitot tubes which in operative position have their openings arranged substantially in a single cross sectional plane of said conduit, a housing beyond the fluid path of said conduit for receiving said tubes in an inoperative position, and means accessible exteriorly of said conduit for shifting said tubes through arcuate paths to and from said positions.

11. An instrument responding to differential pressures in a fluid conduit comprising positive and static Pitot tubes having their openings arranged substantially in a single cross sectional plane of said conduit at a distance from the conduit axis approximately .7 the radius of said conduit at said plane.

12. An instrument responding to differential pressures in a fluid conduit comprising positive and static Pitot tubes, tubular members communicating with and pivotally supporting said tubes in their operative positions with their openings in said conduit, a housing beyond the fluid path of said conduit for receiving said tubes in an inoperative position, means defining a port between said conduit and said housing, and means for closing said port when said tubes are disposed in said housing.

13. An instrument responding to differential pressures in a fluid conduit comprising positive and static Pitot tubes, tubular members communicating with and pivotally supporting said tubes in their operative positions with their openings in said conduit, a housing beyond the fluid path of said conduit for receiving said tubes in an inoperative position, means defining a port between said conduit and said housing, and means accessible exteriorly of said conduit for closing said port when said tubes are disposed in said housing.

14. An instrument responding to differential pressures in a fluid conduit comprising positive and static Pitot tubes pivotally supported in their operative positions with their openings in said conduit, a housing beyond the fluid path of said conduit for receiving said tubes in an inoperative position, and tubular means communicating with said tubes accessible exteriorly of said conduit for shifting said tubes between their operative and inoperative positions.

GEORGE S. BINCKLEY.